(12) United States Patent
Hosokawa et al.

(10) Patent No.: US 8,206,606 B2
(45) Date of Patent: Jun. 26, 2012

(54) OXIDE MAGNETIC MATERIAL

(75) Inventors: Seiichi Hosokawa, Osaka (JP); Yoshinori Kobayashi, Osaka (JP); Yasunobu Ogata, Miyagi (JP); Etsushi Oda, Osaka (JP)

(73) Assignee: Hitachi Metals, Ltd., Tokyo (JP)

( * ) Notice: Subject to any disclaimer, the term of this patent is extended or adjusted under 35 U.S.C. 154(b) by 339 days.

(21) Appl. No.: 12/145,703

(22) Filed: Jun. 25, 2008

(65) Prior Publication Data
US 2009/0261288 A1 Oct. 22, 2009

Related U.S. Application Data

(63) Continuation of application No. PCT/JP2006/325859, filed on Dec. 26, 2006.

(30) Foreign Application Priority Data

Dec. 28, 2005 (JP) ................................. 2005-378779

(51) Int. Cl.
*H01F 1/11* (2006.01)
*H01F 41/02* (2006.01)
*C04B 35/26* (2006.01)

(52) U.S. Cl. .................................. 252/62.63; 252/62.54

(58) Field of Classification Search ............... 252/62.63, 252/62.54
See application file for complete search history.

(56) References Cited

U.S. PATENT DOCUMENTS

| 6,139,766 | A | 10/2000 | Taguchi et al. | |
|---|---|---|---|---|
| 6,402,980 | B1 | 6/2002 | Taguchi et al. | |
| 2006/0284136 | A1* | 12/2006 | Takami et al. | 252/62.63 |
| 2007/0138432 | A1* | 6/2007 | Minachi et al. | 252/62.63 |

FOREIGN PATENT DOCUMENTS

| JP | 2001-68320 A | 3/2001 |
|---|---|---|
| JP | 2007-123511 A | 5/2007 |
| WO | WO 2005/027153 * | 3/2005 |

OTHER PUBLICATIONS

Official communication issued in counterpart European Application No. 06843243.4, mailed on Mar. 13, 2009.
Official Communication issued in International Patent Application No. PCT/JP2006/325859, mailed on Apr. 10, 2007.
English translation of the official communication issued in counterpart International Application No. PCT/JP2006/325859, mailed on Jul. 10, 2008.

* cited by examiner

*Primary Examiner* — Carol M Koslow
(74) *Attorney, Agent, or Firm* — Keating & Bennett, LLP

(57) ABSTRACT

An oxide magnetic material includes a ferrite with a hexagonal structure as its main phase. Metallic elements included in the oxide magnetic material are represented by the formula:

$$Ca_{1-x-x'}La_xSr_{x'}Fe_{2n-y}Co_y,$$

where atomic ratios x, x' and y and a molar ratio n satisfy $0.4 \leq x \leq 0.6$, $0.01 \leq x' \leq 0.3$, $0.2 \leq y \leq 0.45$ and $5.2 \leq n \leq 5.8$, respectively.

11 Claims, 7 Drawing Sheets

OXIDE MAGNETIC MATERIAL

BACKGROUND OF THE INVENTION

1. Field of the Invention

The present invention relates to an oxide magnetic material.

2. Description of the Related Art

Ferrite is a generic term for any compound including an oxide of a divalent cationic metal and trivalent iron, and ferrite magnets have found a wide variety of applications in numerous types of rotating machines, loudspeakers, and so on. Typical materials for a ferrite magnet include Sr ferrites ($SrFe_{12}O_{19}$) and Ba ferrites ($BaFe_{12}O_{19}$) having a hexagonal magnetoplumbite structure. Each of these ferrites is made of iron oxide and a carbonate of strontium (Sr), barium (Ba) or any other suitable element, and can be produced at a relatively low cost by a powder metallurgical process.

A basic composition of a ferrite having the magnetoplumbite structure is normally represented by the chemical formula $AO \cdot 6Fe_2O_3$, where A is a metal element to be divalent cationic and is selected from the group consisting of Sr, Ba, Pb and other suitable elements.

Recently, it was proposed that La be substituted for a portion of Sr and Co and Zn be substituted for a portion of Fe to increase the coercivity and the remanence of an Sr ferrite (see Patent Document No. 1).

It was also proposed that La and Ca be substituted for a portion of Sr and Co be substituted for a portion of Fe to increase the coercivity of an Sr ferrite while maintaining high remanence thereof (see Patent Document No. 2).

It was also proposed that a rare-earth element such as La be substituted for a portion of Ca in a Ca ferrite and Co be substituted for a portion of Fe to obtain a ferrite magnet with high remanence and high coercivity (see Patent Document No. 3).

Patent Document No. 1: Japanese Patent Publication No. 3163279

Patent Document No. 2: Pamphlet of PCT International Application Publication No. WO2005/027153

Patent Document No. 3: Japanese Patent Publication No. 3181559

As for a Ca ferrite, it is known that a structure such as $CaO-Fe_2O_3$ or $CaO-2Fe_2O_3$ has good stability and can produce a hexagonal ferrite when La is added thereto. However, the magnetic properties achieved by such a Ca ferrite are comparable to those achieved by a conventional Ba ferrite and are far from being satisfactory. That is why Patent Document No. 3 discloses a technique for increasing the remanence $B_r$ and the coercivity $H_{cJ}$ and improving the temperature characteristic of the coercivity $H_{cJ}$ by adding both La and Co to a Ca ferrite (which will be referred to herein as a "CaLaCo ferrite").

According to Patent Document No. 3, the anisotropic magnetic field $H_A$ of such a CaLaCo ferrite, in which a portion of Ca is replaced with a rare-earth element such as La and in which a portion of Fe is replaced with Co, for example, is at most 10% higher than that of an Sr ferrite and can be as high as 20 kOe or more.

According to a specific example of a CaLaCo ferrite disclosed in Patent Document No. 3, if $Ca_{1-x1}La_{x1}(Fe_{12-x1}Co_{x1})_z$ satisfies x=y=0 through 1 and z=1, good properties are achieved when x=y=0.4 to 0.6. Specifically, $B_r$=4.0 kG (=0.40 T) and $H_{cJ}$=3.7 kOe (=294 kA/m) when sintering is carried out in the air and $B_r$=4.0 kG (=0.40 T) and $H_{cJ}$=4.2 kOe (=334 kA/m) when sintering is carried out in oxygen.

If the mole fraction of z is decreased to 0.85 in the compositional formula mentioned above (i.e., x=0.5, y=0.43 and x/y=1.16), $B_r$=4.4 kG (=0.44 T) and $H_{cJ}$=3.9 kOe (=310 kA/m) when sintering is carried out in the air and $B_r$=4.49 kG (=0.449 T) and $H_{cJ}$=4.54 kOe (=361 kA/m) when sintering is carried out in 100% oxygen. The latter properties are the best ones for Patent Document No. 3.

Such an Sr ferrite, in which a portion of Sr is replaced with a rare-earth element such as La and a portion of Fe is replaced with Co according to Patent Documents Nos. 1 and 2 (and which will be referred to herein as an "SrLaCo ferrite") has such good magnetic properties as to be replacing conventional Sr and Ba ferrites more and more often in various applications.

Ferrite magnets are used most often in motors. Therefore, if the magnetic properties of ferrite magnets can be improved, motors can have either increased outputs or reduced sizes. For that reason, there is a growing demand for high-performance ferrite magnets, of which the remanence $B_r$ and coercivity $H_{cJ}$ are both sufficiently high. And even the SrLaCo ferrites mentioned above should have their magnetic properties further improved.

A CaLaCo ferrite according to Patent Document No. 3 produces an anisotropic magnetic field $H_A$ that is higher than that of an SrLaCo ferrite, has good magnetic properties such as $B_r$ and $H_{cJ}$ that are comparable to those of SrLaCo ferrites, and therefore, is expected to expand their applications in the near future. However, the CaLaCo ferrites that have been proposed so far would have not reached their full potential yet and should be further ameliorated to live up to high expectations.

SUMMARY OF THE INVENTION

Preferred embodiments of the present invention provide an oxide magnetic material, of which the remanence $B_r$ and coercivity $H_{cJ}$ are both superior to those of a conventional SrLaCo or CaLaCo ferrite.

These advantages are achieved by any of the following preferred embodiments of the present invention:

(1) An oxide magnetic material including a ferrite with a hexagonal structure as its main phase, wherein metallic elements included in the oxide magnetic material are represented by the formula:

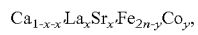

$$Ca_{1-x-x'}La_xSr_{x'}Fe_{2n-y}Co_y,$$

where atomic ratios x, x' and y and a molar ratio n satisfy:

$0.4 \leq x \leq 0.6$, $0.01 \leq x' \leq 0.3$, $0.2 \leq y \leq 0.45$, and $5.2 \leq n \leq 5.8$, respectively.

(2) The oxide magnetic material of (1), wherein the atomic ratio x satisfies $0.45 \leq x \leq 0.58$.

(3) The oxide magnetic material of (1), wherein the atomic ratio x' satisfies $0.01 \leq x' \leq 0.2$.

(4) The oxide magnetic material of (1), wherein the atomic ratio y satisfies $0.2 \leq y \leq 0.4$.

(5) The oxide magnetic material of (1), wherein the molar ratio n satisfies $5.2 \leq n \leq 5.5$.

(6) The oxide magnetic material of (1), wherein the molar ratio n satisfies $5.3 \leq n \leq 5.5$.

(7) The oxide magnetic material of (1), wherein the material satisfies $x/y \geq 1.3$.

(8) The oxide magnetic material of one of (1) to (7) is a calcined body.

(9) The oxide magnetic material of (8), wherein the material includes at least 50% of crystals with an aspect ratio of three or less, the aspect ratio being the ratio of the length l to the thickness d of the crystals.

(10) The oxide magnetic material of one of (1) to (7) is a sintered magnet.

(11) The oxide magnetic material of (10), wherein the material is made by adding at least one of 1.8 mass % or less of $CaCO_3$, 0.5 mass % or less of $SrCO_3$ and 1.0 mass % or less of $SiO_2$ to the calcined body and then sintering them.

(12) The oxide magnetic material of (11), wherein the molar ratio n satisfies $4.3 \leq n \leq 5.8$.

(13) The oxide magnetic material of (10) or (11), wherein the material has a coercivity $H_{cJ}$ of 360 kA/m or more.

(14) The oxide magnetic material of (10) or (11), wherein the material has a remanence $B_r$ of 0.45 T or more.

(15) A magnetic recording medium including the oxide magnetic material of (8).

(16) A bonded magnet including the oxide magnetic material of (8).

(17) A rotating machine comprising the oxide magnetic material of one of (10) to (13).

(18) A sintered magnet including a ferrite with a hexagonal structure as its main phase, wherein metallic elements included in the sintered magnet are represented by the formula:

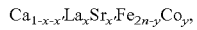

$Ca_{1-x-x'}La_xSr_{x'}Fe_{2n-y}Co_y$, where atomic ratios x, x' and y and a molar ratio n satisfy:
$0.32 \leq x \leq 0.6$,
$0.008 \leq x' \leq 0.33$,
$0.16 \leq y \leq 0.45$, and
$4.3 \leq n \leq 5.8$, respectively.

Preferred embodiments of the present invention provide an oxide magnetic material, of which the remanence $B_r$ and coercivity $H_{cJ}$ are both superior to those of a conventional SrLaCo or CaLaCo ferrite.

A calcined body according to a preferred embodiment of the present invention includes at least 50% of crystals with an aspect ratio of three or less, which is the ratio of the length l to the thickness d of the crystals, and with a small grain size. That is why if a sintered magnet is made of such a calcined body, a high $B_r$ and a high $H_{cJ}$ are achieved.

According to a preferred embodiment of the present invention, magnetic properties that are at least comparable to $B_r$ and $H_{cJ}$ achieved by sintering a CaLaCo ferrite according to Patent Document No. 3 in 100% oxygen (i.e., the best properties according to Patent Document No. 3) are realized by performing a sintering process in the air, which is easier than the sintering process in oxygen and which contributes to stabilized production.

A sintered magnet according to a preferred embodiment of the present invention has a high $B_r$ and a high $H_{cJ}$, and therefore, is best suited for use in motors and other applications.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
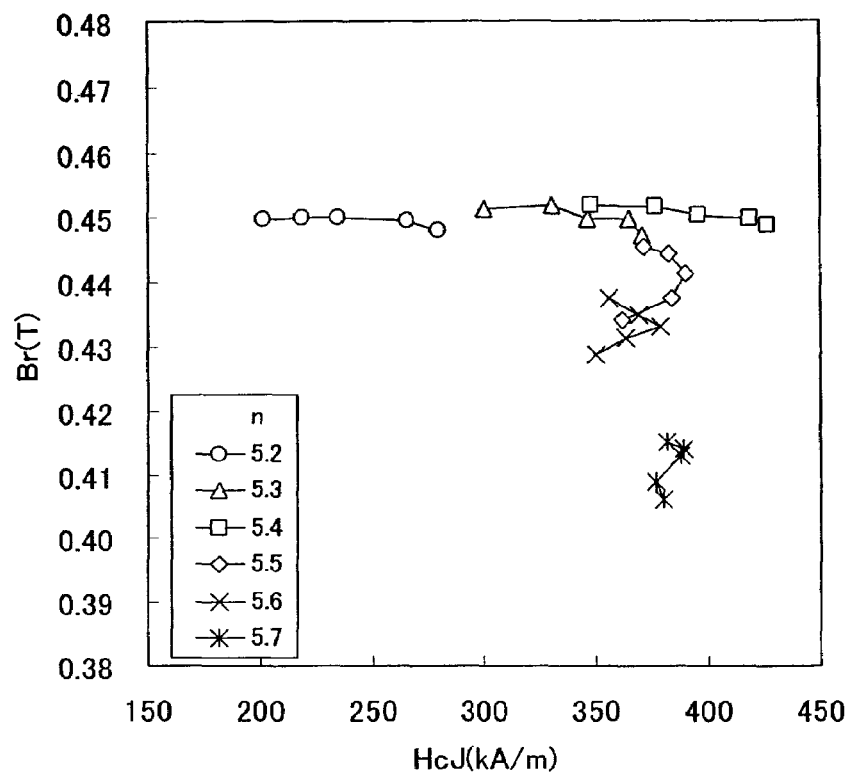
FIG. 1 is a graph showing relationships between the remanence $B_r$ and the coercivity $H_{cJ}$ of a sintered magnet according to a preferred embodiment of the present invention in a situation where x=0.45, x'=0.1, y=0.3, and n=5.2 to 5.7 in its compositional formula $Ca_{1-x-x'}La_xSr_{x'}Fe_{2n-y}Co_yO\alpha$.

The present inventors paid attention to the fact that a CaLaCo ferrite has a higher anisotropic magnetic field $H_A$ than that of an SrLaCo ferrite and carried out extensive research to find how to improve the properties of the CaLaCo ferrite. As a result, the present inventors discovered that the atomic ratio of Ca, La and Sr, the atomic ratio of Fe and Co and the molar ratio n of (Ca+La+Sr):(Fe+Co) had best ranges in the CaLaCo ferrite.

Specifically, the present inventors discovered that an oxide magnetic material with a high $B_r$ and a high $H_{cJ}$ could be obtained by setting the ratio of x (La) to y (Co) such that at least x/y≧1 is satisfied, preferably x/y≧1.3 is satisfied, and more preferably x/y≧1.38 is satisfied, defining Ca/Sr≧1, and setting n in the range of 5.2 to 5.8, preferably in the range of 5.2 to 5.5 and more preferably in the range of 5.3 to 5.5.

Patent Document No. 1 does not teach replacing 50% or more of Sr with Ca (i.e., Ca/Sr≧1) in its SrLaCo ferrite. Likewise, in the SrLaCo ferrite of Patent Document No. 2 in which a portion of Sr is replaced with Ca, the percentage of Ca to be replaced (i.e., Ca/(Sr+Ca)) is less than 50% and fails to disclose that 50% or more of Sr is replaced with Ca (i.e., such that Ca/Sr≧1 is satisfied).

Also, Patent Document No. 3 does disclose a CaLaCo ferrite but preferred ranges of x and y are 0.4 to 0.6 according to its description of preferred embodiments. Also, according to Patent Document No. 3, the x/y ratio is basically supposed to be x=y (i.e., x/y=1) and only examples in which x/y=1.05 and 1.16 are shown in its description of preferred embodiments.

Patent Document No. 3 provides an example in which a portion of Ca in the CaLaCo ferrite is replaced with Sr (i.e., Example #11 shown in FIGS. 15 and 16). However, x (La) and y (Co) are both 0.6 and the greater the percentage of Ca replaced with Sr, the lower the coercivity $H_{cJ}$. Furthermore, to achieve high magnetic properties, the CaLaCo ferrite of Patent Document No. 3 must be baked in 100% oxygen, thus increasing the cost inevitably.

An oxide magnetic material according to a preferred embodiment of the present invention includes metallic elements represented by the formula $Ca_{1-x-x'}La_xSr_{x'}Fe_{2n-y}Co_y$ and oxygen. This formula can be rewritten into the general formula $Ca_{1-x-x'}La_xSr_{x'}Fe_{2n-y}Co_yO\alpha$ including oxygen.

In this formula, if x=y and if the molar ratio n=6, then α=19. However, since 5.2≦n≦5.8 according to a preferred embodiment of the present invention, α is not exactly equal to 19. Also, the number of moles of oxygen changes with the valences of Fe and Co and according to the type of the calcining or sintering atmosphere. For example, if the sintering atmosphere is a reducing atmosphere, chances are oxygen has some vacancies. Furthermore, Fe included in ferrite is usually trivalent but could change into divalent, for example, and the valence of Co could also change. As a result of these changes, the ratio of oxygen to the metallic elements could vary and α=19 would not always be satisfied. That is why in the oxide magnetic material according to a preferred embodiment of the present invention, the number of moles of oxygen is represented by α and the magnetic material will be represented by the formula $Ca_{1-x-x'}La_xSr_{x'}Fe_{2n-y}Co_yO\alpha$.

The oxide magnetic material according to a preferred embodiment of the present invention is represented by the formula $Ca_{1-x-x'}La_xSr_{x'}Fe_{2n-y}Co_yO\alpha$, where the atomic ratios x, x' and y and the molar ratio n satisfy 0.4≦x≦0.6, 0.01≦x'≦0.3, 0.2≦y≦0.45 and 5.2≦n≦5.8, respectively. It should be noted that this formula applies to the oxide magnetic material and calcined body of a preferred embodiment of the present invention. This is because if a required additive is supplied during the fine pulverization process, the n value may change as will be described later. That is why this formula will be used herein to represent the "composition of a calcined body".

The present invention relates to an improvement of a CaLaCo ferrite that includes Ca as an essential element, a portion of which may be replaced with Sr. With a portion of Ca replaced with Sr, a portion of Ca or a portion of Sr may be further replaced with Ba and/or Pb to the point that the magnetic properties do not deteriorate.

La is another essential element but a portion of Ca or a portion of La may be replaced with at least one element selected from the group consisting of the rare-earth elements, Y and Bi to such a degree that the magnetic properties do not deteriorate. Those substituents could be tolerated as inevitably contained impurities, too.

Co is another essential element but a portion of Fe or a portion of Co may be replaced with at least one element selected from the group consisting of Zn, Ni and Mn to such a degree that the magnetic properties do not deteriorate. Those substituents could be tolerated as inevitably contained impurities, too. Likewise, even elements other than those mentioned above could be tolerated as long as they are inevitably contained impurities.

Hereinafter, it will be described why x, x', y and n preferably fall within these ranges in the calcined body composition.

x represents the content of La and 0.4≦x≦0.6 is preferably satisfied. This range is preferred because if x were less than 0.4 or greater than 0.6, $B_r$ and $H_{cJ}$ would decrease. A more preferable range is 0.45≦x≦0.58.

x' represents the content of Sr and 0.01≦x'≦0.3 is preferably satisfied. This range is preferred because if x' were less than 0.01, $B_r$ and $H_{cJ}$ would decrease, the size and aspect ratio of crystals in the calcined body could not be reduced as will be described later, and eventually $H_{cJ}$ would drop, which should be avoided. On the other hand, if x' were greater than 0.3, Ca/Sr≧1 could not be satisfied anymore and $B_r$ and $H_{cJ}$ would decrease, which is not beneficial, either. A more preferable range is 0.01≦x'≦0.2.

y represents the content of Co and 0.2≦y≦0.45 is preferably satisfied. As described above, it has been believed that y preferably falls within the range of 0.4 to 0.6 in a CaLaCo ferrite. However, as described in Patent Document No. 3, if a portion of Ca is replaced with Sr and if y falls within the range of 0.4 to 0.6, $H_{cJ}$ will decrease. This is probably because hetero phases including a lot of Co will be produced in the micrographic. According to a preferred embodiment the present invention, y preferably satisfies 0.2≦y≦0.45, more preferably 0.2≦y≦0.4 and x/y ratio needs to satisfy x/y≧1 at least, and preferably satisfies x/y≧1.3, more preferably x/y≧1.38. That is to say, at least one preferred embodiment of the present invention is characterized in that by making the calcined body include more x than y, $H_{cJ}$ will not decrease and high $B_r$ and high $H_{cJ}$ are realized even if y is increased. However, if y were less than 0.2 or greater than 0.45, $B_r$ and $H_{cJ}$ would decrease, which should be avoided. Also, if x/y exceeded 2.25, the magnetic properties would deteriorate, which is not beneficial, either.

The molar ratio n, defining the ratio of Ca, La and Sr to Fe and Co, preferably satisfies 5.2≦n≦5.8, in which good $B_r$ and $H_{cJ}$ can be obtained. A more preferable range is 5.2≦n≦5.5. Particularly if n satisfies 5.3≦n≦5.5 and if x and y fall within their preferred ranges specified above, good properties including a $B_r$ of 0.45 T or more and an $H_{cJ}$ of 360 kA/m (=4.5 kOe or more) will be achieved. And if they fall within their most preferred ranges, outstanding properties including a $B_r$ of 0.45 T or more and an $H_{cJ}$ of 400 kA/m (=5 kOe or more) will be achieved.

According to a preferred embodiment of the present invention, as x' increases, n tends to increase its preferred value. For example, if x' is 0.01, n is preferably about 5.3. But if x' is in the range of 0.1 to 0.2, n is preferably in the range of 5.4 to 5.5. By controlling n according to the mole fraction of x' in this manner, better magnetic properties are achieved.

Hereinafter, a method of making an oxide magnetic material according to a preferred embodiment of the present invention will be described.

First, material powders of $CaCO_3$, $La_2O_3$, $SrCO_3$, $Fe_2O_3$, $Co_3O_4$ and so on are provided. The provided powders are combined together such that x, x', y and n fall within their preferred ranges according to the compositional formula described above. The material powders may include not just oxides and carbonates but also hydroxides, nitrates and chlorides and may be in the form of solution as well. Also, in producing a sintered magnet as a form of an oxide magnetic material, the material powders other than $CaCO_3$, $La_2O_3$, $SrCO_3$, and $Fe_2O_3$ may be added either when the powders are mixed or after the calcining process (to be described later) is finished. For example, after $CaCO_3$, $Fe_2O_3$ and $La_2O_3$ have been combined, mixed together and calcined, $CO_3O_4$ and so on may be added thereto and the mixture may be pulverized, compacted and then sintered. Optionally, to promote the reactivity during the calcining process, approximately 1 mass % of a compound including $B_2O_3$ and $H_3BO_3$ may be added.

Among other things, the addition of $H_3BO_3$ is particularly effective in increasing $B_r$ and $H_{cJ}$. $H_3BO_3$ is preferably added up to 0.2 mass %, most preferably in the vicinity of 0.1 mass %. If less than 0.1 mass % of $H_3BO_3$ were added, $B_r$ would increase significantly. On the other hand, if more than 0.1 mass % of $H_3BO_3$ were added, then $H_{cJ}$ would increase noticeably. However, if more than 0.2 mass % of $H_3BO_3$ were added, then $B_r$ would decrease, which is not beneficial. That is why when used in applications in which $B_r$ plays a key role, 0.05 mass % to 0.15 mass % of $H_3BO_3$ is preferably added. Meanwhile, when used in applications in which $H_{cJ}$ plays an important role, 0.10 mass % to 0.20 mass % of $H_3BO_3$ is preferably added. $H_3BO_3$ also has the effect of controlling crystal grains during a sintering process. For that reason, it is also effective to add $H_3BO_3$ after the calcining process (i.e., before the fine pulverization process or before the sintering process). Thus, $H_3BO_3$ may be added both before and after the calcining process.

The material powders may be combined together by either a wet process or a dry process. When stirred up with a medium such as steel balls, the material powders can be mixed more uniformly. In a wet process, water is used as the solvent. Optionally, a known dispersant such as ammonium polycarboxylate or calcium gluconate may be used in order to disperse the material powders. The mixed material slurry is dehydrated to be a mixed material powder.

Next, the material powder mixture is heated by using a rotary kiln, an electric furnace or a gas furnace, for example, thereby producing a ferrite compound having a magnetoplumbite structure through a solid-state reaction. This process will be referred to herein as "calcining" and a compound obtained by this process will be referred to herein as a "calcined body".

The calcining process needs to be carried out in an atmosphere with an oxygen concentration of at least 5% and may usually be carried out in the air.

In the calcining process, as the temperature rises, a ferrite phase is gradually formed through the solid-state reaction. The formation of the ferrite phase is completed at about 1,100° C. If the calcining process were finished at a temperature of about 1,100° C. or less, then unreacted $\alpha$-$Fe_2O_3$ would remain to deteriorate the resultant magnet properties. The effects of preferred embodiments of the present invention manifests itself if the calcining temperature exceeds 1,100° C. and achieved more significantly if the calcining temperature falls within the range of 1,100° C. to 1,300° C. However, if the calcining temperature exceeded 1,400° C., then various inconveniences might be created. For example, crystal grains might grow so much that it would take a lot of time to pulverize the powder in the subsequent pulverizing process step. In view of these considerations, the calcining temperature is preferably higher than 1,100° C. but equal to or lower than 1,400° C., more preferably in the range of 1,150° C. to 1,300° C. Also, the calcining process time is not particularly limited but is preferably 0.5 to 5 hours.

The calcined body obtained by this calcining process has a main phase of a ferrite having a hexagonal structure represented by the chemical formula:

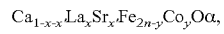

where
$0.4 \leq x \leq 0.6$,
$0.01 \leq x' \leq 0.3$,
$0.2 \leq y \leq 0.45$, and
$5.2 \leq n \leq 5.8$, respectively, and becomes the oxide magnetic material according to a preferred embodiment of the present invention.

One of the unique features of preferred embodiments of the present invention is that the calcined body obtained as described above consists mostly of crystals with aspect ratios (i.e., the ratios of the length l to the thickness d) of three or less, more preferably two or less, and with small grain sizes as will be described later for specific examples of the present invention. If x, x', y and n are controlled so as to fall within the best ranges, then crystals in the calcined body would have a decreased size and a decreased aspect ratio. As a result, the oxide magnetic material according to a preferred embodiment of the present invention would achieve a high $B_r$ and a high $H_{cJ}$.

By pulverizing and/or milling such a calcined body, a magnetic powder can be obtained and can be used to make a bonded magnet or a magnetic recording medium. Optionally, the calcined body may be made by a known manufacturing technique such as a spray pyrolysis method or a coprecipitation process.

When used to make a bonded magnet, the magnetic powder is mixed with a rubber with some flexibility or a hard and lightweight plastic. Then, the mixture is subjected to a molding process, which may be carried out by a method such as injection molding, extrusion molding or roll molding. Also, when applied to a bonded magnet, the magnetic powder is preferably thermally treated at a temperature of 700° C. to 1,100° C. for about 0.1 to about 3 hours in order to relax the crystal strain of the magnetic powder. A more preferred temperature range is from 900° C. to 1,000° C.

Meanwhile, when used to make a magnetic recording medium, the magnetic powder may be subjected to the heat treatment process described above, kneaded with any of various known binders, and then the mixture is applied onto a substrate. In this manner, a coated magnetic recording medium can be obtained. Alternatively, a thin-film magnetic layer for use in a magnetic recording medium may be formed by a sputtering process, for example, with the oxide magnetic material according to a preferred embodiment of the present invention and a sintered magnet including the material used as a target.

Next, a method for producing a sintered magnet using this oxide magnetic material will be described.

The calcined body is subjected to a fine pulverization process using a vibrating mill, a ball mill and/or an attritor so as to be pulverized into fine powder particles having a mean particle size of about 0.4 μm to about 0.8 μm as measured by the air permeability method. The fine pulverization process may be either dry pulverization or wet pulverization but is preferably carried out as a combination of these two types of pulverization processes.

The wet pulverization process may be carried out using an aqueous solvent such as water or any of various non-aqueous solvents including organic solvents such as acetone, ethanol and xylene. As a result of the wet pulverization process, slurry is produced as a mixture of the solvent and the calcined body. Any of various known dispersants or surfactants is preferably added to the slurry at a solid matter ratio of 0.2 mass % to 2.0 mass %. After the wet pulverization process is over, the slurry is preferably dehydrated and dried.

In the fine pulverization process, at least one of $CaCO_3$, $SrCO_3$ and $SiO_2$ and/or another additive such as $Cr_2O_3$ or $Al_2O_3$ may be added to the calcined body to improve the magnetic properties thereof. If any of these additives is added, at most 1.8 mass % of $CaCO_3$, at most 0.5 mass % of $SrCO_3$, at most 1.0 mass % of $SiO_2$, at most 5.0 mass % of $Cr_2O_3$ and at most 5.0 mass % of $Al_2O_3$ are preferably added.

Among other things, it is particularly effective to add $CaCO_3$, $SrCO_3$ and $SiO_2$. And if $CaCO_3$, $SrCO_3$, $SiO_2$ and $H_3BO_3$ are added in combination, high $B_r$ and high $H_{cJ}$ are achieved. $SiO_2$ also has the effect of controlling crystal grains during the calcining process. For that reason, it is also effective to add $SiO_2$ before the calcining process. Thus, $SiO_2$ may be added both before the calcining process and before the fine pulverization process.

If $CaCO_3$ and $SrCO_3$ are selected as the additives, the n value in the calcined body composition will vary. Specifically, if 1.8 mass % of $CaCO_3$ and 0.5 mass % of $SrCO_3$ are both added to a calcined body with a calcined body composition that satisfies $5.2 \leq n \leq 5.8$ and then the mixture is sintered, the sintered body composition will satisfy $4.3 \leq n \leq 4.8$. Unless $CaCO_3$ and $SrCO_3$ are added, the sintered body composition, as well as the calcined body composition, will satisfy $5.2 \leq n \leq 5.8$. That is why the n range of the sintered body composition will be $4.3 \leq n \leq 5.8$, which is defined by the lower limit of the calcined body with the additives and the upper limit of the calcined body without the additives. Thus, this composition will be referred to herein as a "sintered body composition" to be compared to the calcined body composition. In the following description, however, the composition will always be the calcined body composition unless otherwise stated.

If $CaCO_3$ and $SrCO_3$ are selected as additives, added to the calcined body, and then the mixture is sintered, the mole fractions x, x' and y in the sintered body composition will have varied from the mole fractions x, x' and y of the calcined body. Specifically, suppose x, x' and y satisfy $0.4 \leq x \leq 0.6$, $0.01 \leq x' \leq 0.3$, and $0.2 \leq y \leq 0.45$ in the formula $Ca_{1-x-x'}La_xSr_{x'}Fe_{2n-y}Co_yO\alpha$. In that case, if 1.8 mass % of $CaCO_3$ and 0.5 mass % of $SrCO_3$ are added, $0.32 \leq x \leq 0.6$, $0.008 \leq x' \leq 0.33$, and $0.16 \leq y \leq 0.45$ could be satisfied when the variation is the greatest. This is because the addition of $CaCO_3$ and $SrCO_3$ has increased the content of Ca and the content of Sr in the sintered body compared to when the raw material powders were mixed together. That is to say, since Ca+La+Sr=1, the addition of $CaCO_3$ will increase Ca and decrease La and Sr, thus decreasing the mole fractions x and x'. On the other hand, the addition of $SrCO_3$ will increase Sr to augment x' and decrease Ca and La to diminish the mole fraction x. As a result, n, representing the molar ratio of Fe sites to Ca sites, decreases as described above and comes to fall within the range $4.3 \leq n \leq 5.8$. As n varies in this manner, y decreases, too.

Consequently, a sintered magnet according to a preferred embodiment of the present invention includes a ferrite with a hexagonal structure as its main phase, wherein metallic elements included in the sintered magnet are represented by the formula:

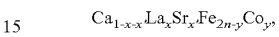

$$Ca_{1-x-x'}La_xSr_{x'}Fe_{2n-y}Co_y,$$

where atomic ratios x, x' and y and a molar ratio n satisfy:
$0.32 \leq x \leq 0.6$,
$0.008 \leq x' \leq 0.33$,
$0.16 \leq y \leq 0.45$, and
$4.3 \leq n \leq 5.8$, respectively.

Thereafter, the slurry is pressed with or without a magnetic field applied thereto, while the solvent is removed from the slurry. By pressing the slurry under a magnetic field, the crystallographic orientations of the powder particles can be aligned with each other. As a result of the molding process under the magnetic field, the magnetic properties can be improved significantly. Optionally, to further align the orientations, 0.01 mass % to 1.0 mass % of dispersant or lubricant may be added.

The compacts formed by the molding process are subjected to a degreasing process, if necessary, and then to a sintering process, which may be carried out using an electric furnace or a gas furnace, for example.

The sintering process may be carried out in the air. As will be described later for specific examples of the present invention, the oxide magnetic material according to a preferred embodiment of the present invention can achieve a high $B_r$ and a high $H_{cJ}$ as a result of a sintering process in the air and has better magnetic properties than the CaLaCo ferrite that is baked in the air as disclosed in Patent Document No. 3. Also, by setting x, x', y and n within their preferred ranges, magnetic properties, which are at least comparable to, and even better than, those of the CaLaCo ferrite of Patent Document No. 3 that is baked in 100% oxygen, are realized.

The sintering process is preferably carried out at a temperature of 1,150° C. to 1,250° C. for 0.5 to 2 hours. A sintered magnet obtained by the sintering process has an average crystal grain size of approximately 0.5 μm to approximately 4 μm.

After having been sintered, the sintered body is subjected to various known manufacturing processing steps including finishing, cleaning and checking to complete a ferrite sintered magnet as a final product.

EXAMPLES

Example 1

First, a $CaCO_3$ powder, an $La_2O_3$ powder, an $SrCO_3$ powder, an $Fe_2O_3$ powder and a $Co_3O_4$ powder were provided and mixed together such that the formula $Ca_{1-x-x'}La_xSr_{x'}Fe_{2n-y}Co_yO\alpha$ would satisfy x=0.45, x'=0.1, y=0.3, and n=5.2 to 5.7. After $H_3BO_3$ was further added thereto, the resultant material powders were mixed together in a wet ball mill for four hours, dried, and then sieved. Thereafter, the powder was calcined in the air at 1,200° C. for three hours, thereby obtaining a calcined body in the form of powder.

Next, 0.6 mass % of $CaCO_3$ powder (when converted into CaO) and 0.45 mass % of $SiO_2$ powder were further added to the calcined body. Then, using water as a solvent, the mixture was finely pulverized in a wet ball mill to a mean particle size of 0.55 μm as measured by the air permeability method. Thereafter, while the solvent was removed from the resultant finely pulverized slurry, the slurry was pressed and compacted under a magnetic field with a strength of 0.8 T. Next, the resultant compact was sintered in the air at 1,180° C. to 1,220° C. for one hour to make a sintered magnet. The remanences $B_r$ and coercivities $H_{cJ}$ of the resultant sintered magnets were measured. The results are shown in FIG. 1.

Example 2

A sintered magnet was produced as in the first specific example described above except that the formula $Ca_{1-x-x'}La_xSr_{x'}Fe_{2n-y}Co_yO\alpha$ would satisfy x=0.40, x'=0.3, y=0.3, and n=5.5 to 5.8. The remanences $B_r$ and coercivities $H_{cJ}$ of the resultant sintered magnets were measured. The results are shown in FIG. 2.

As is clear from FIG. 1, good remanences $B_r$ were achieved when n was in the range of 5.2 to 5.4 and good coercivities $H_{cJ}$ were achieved when n was in the range of 5.5 to 5.7. Among other things, when n fell within the range of 5.4 to 5.5, a sintered magnet, of which $B_r$ and $H_{cJ}$ were both high, could be obtained. In this case, the greater n, the lower $B_r$. And when n=5.7, $B_r$ dropped significantly.

Figure 2:
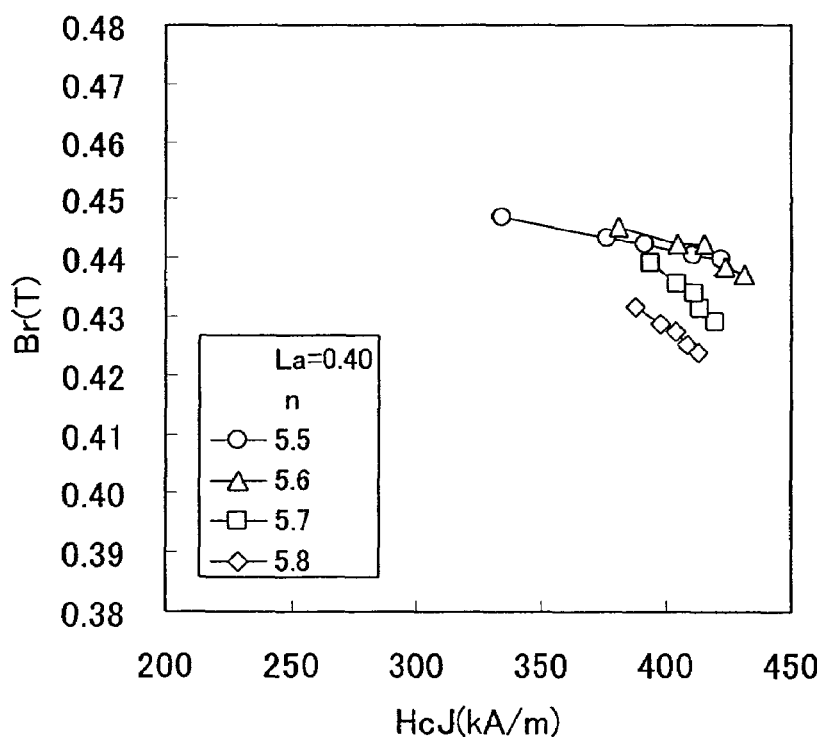
FIG. 2 is a graph showing relationships between the remanence $B_r$ and the coercivity $H_{cJ}$ of a sintered magnet according to a preferred embodiment of the present invention in a situation where x=0.40, x'=0.3, y=0.3, and n=5.5 to 5.8 in its compositional formula $Ca_{1-x-x'}La_xSr_{x'}Fe_{2n-y}Co_yO\alpha$.

Also, as can be seen easily from FIG. 2, if x' (Sr)=0.3, good properties were achieved in a broad n range of 5.5 to 5.8. Furthermore, if x'=0.3, $B_r$ did not decrease significantly even when n=5.7 and good magnetic properties were still achieved even when n=5.8. This is because as x' increases, the preferred n value tends to increase. Since the preferred n value varies with x' in this manner, n was defined so as to satisfy $5.2 \leq n \leq 5.8$ in which good properties could be achieved if $0.01 \leq x' \leq 0.3$.

Example 3

A sintered magnet was produced as in the first specific example described above except that the formula $Ca_{1-x-x'}La_xSr_{x'}Fe_{2n-y}Co_yO\alpha$ would satisfy x=0.40 to 0.55, x'=0.1, y=0.3, and n=5.4. The remanences $B_r$ and coercivities $H_{cJ}$ of the resultant sintered magnets were measured. The results are shown in FIG. 3.

Figure 3:
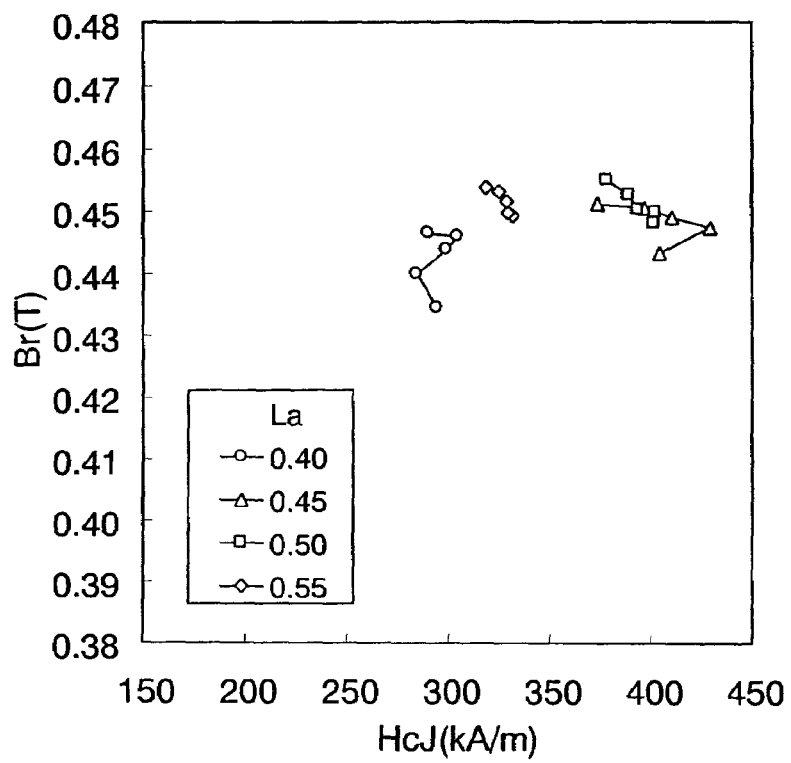
FIG. 3 is a graph showing relationships between the remanence $B_r$ and the coercivity $H_{cJ}$ of a sintered magnet according to a preferred embodiment of the present invention in a situation where x=0.40 to 0.55, x'=0.1, y=0.3, and n=5.4 in its compositional formula $Ca_{1-x-x'}La_xSr_{x'}Fe_{2n-y}Co_yO\alpha$.

As can be seen easily from FIG. 3, good magnetic properties were achieved when y (Co)=0.3, x (La) was in the range of 0.4 to 0.55 and $x/y \geq 1.3$. Among other things, excellent magnetic properties, including a $B_r$ of 0.45 T or more and an $H_{cJ}$ of 360 kA/m (=4.5 kOe) or more, were achieved particularly when x=0.45 and when x=0.5. As in the eleventh and twelfth examples to be described later, the greater the y value, the greater the preferred x value.

Example 4

Figure 4:
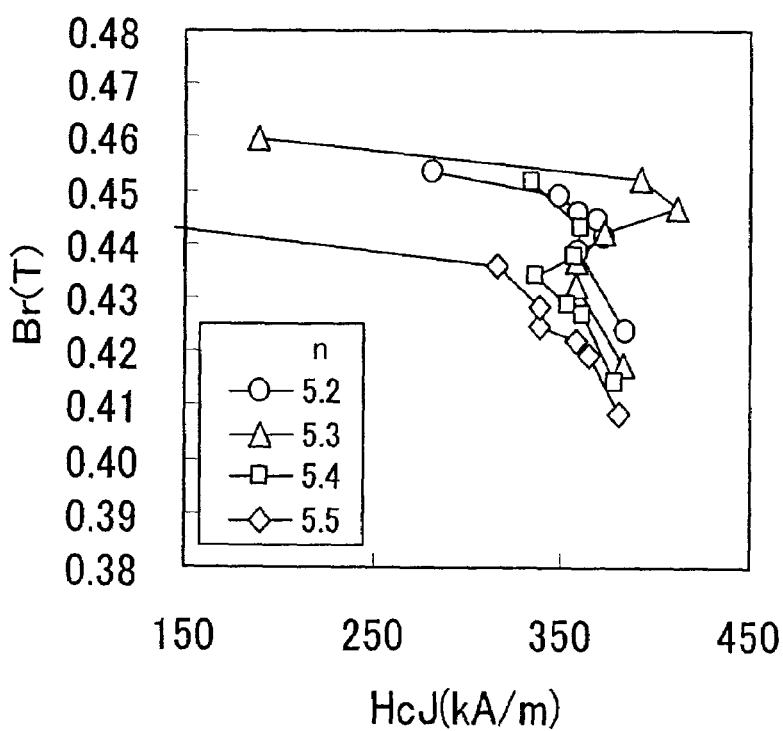
FIG. 4 is a graph showing relationships between the remanence $B_r$ and the coercivity $H_{cJ}$ of a sintered magnet according to a preferred embodiment of the present invention in a situation where x=0.495, x'=0.01, y=0.3, and n=5.2 to 5.5 in its compositional formula $Ca_{1-x-x'}La_xSr_{x'}Fe_{2n-y}Co_yO\alpha$.

A sintered magnet was produced as in the first specific example described above except that the formula $Ca_{1-x-x'}La_xSr_{x'}Fe_{2n-y}Co_yO\alpha$ would satisfy x=0.495, x'=0.01, y=0.3, and n=5.2 to 5.5. The remanences $B_r$ and coercivities $H_{cJ}$ of the resultant sintered magnets were measured. The results are shown in FIG. 4.

Example 5

Figure 5:
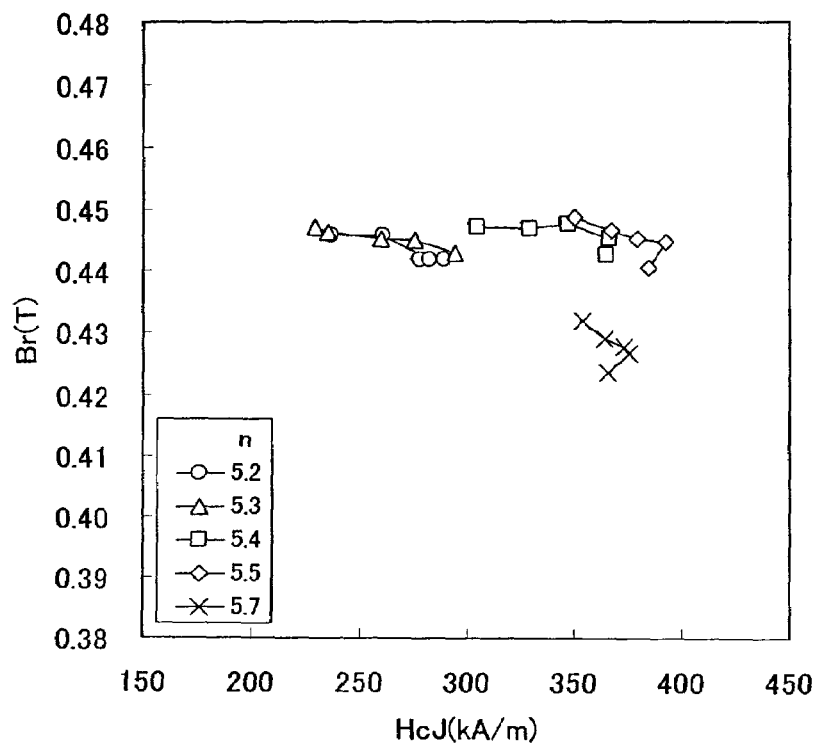
FIG. 5 is a graph showing relationships between the remanence $B_r$ and the coercivity $H_{cJ}$ of a sintered magnet according to a preferred embodiment of the present invention in a situation where x=0.4, x'=0.2, y=0.3, and n=5.2 to 5.7 in its compositional formula $Ca_{1-x-x'}La_xSr_{x'}Fe_{2n-y}Co_yO\alpha$.

A sintered magnet was produced as in the first specific example described above except that the formula $Ca_{1-x-x'}$ $La_xSr_{x'}Fe_{2n-y}Co_yO\alpha$ would satisfy x=0.4, x'=0.2, y=0.3, and n=5.2 to 5.7. The remanences $B_r$ and coercivities $H_{cJ}$ of the resultant sintered magnets were measured. The results are shown in FIG. 5.

Comparative Example 1

Figure 6:
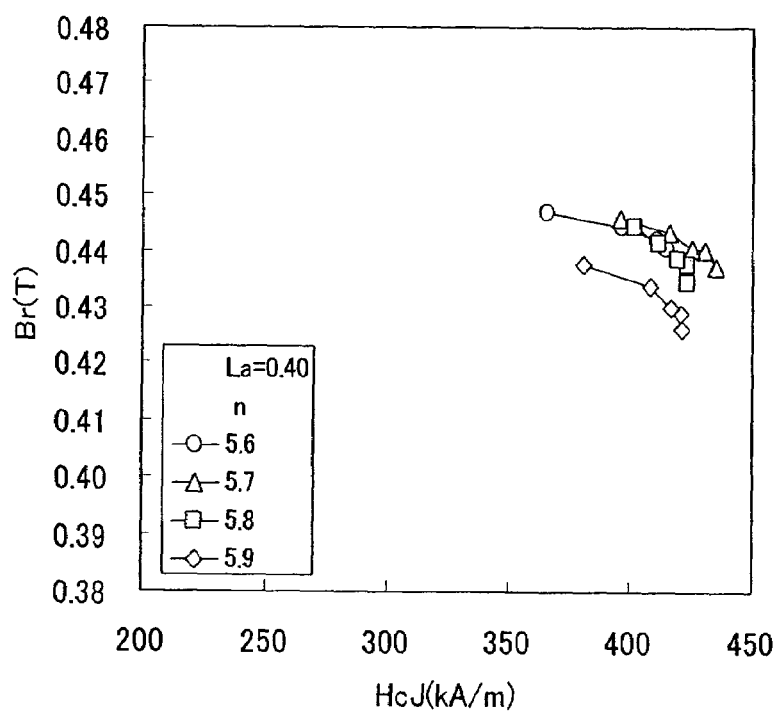
FIG. 6 is a graph showing relationships between the remanence $B_r$ and the coercivity $H_{cJ}$ of a sintered magnet according to a comparative example in a situation where x=0.4, x'=0.4, y=0.3, and n=5.6 to 5.9 in its compositional formula $Ca_{1-x-x'}La_xSr_{x'}Fe_{2n-y}Co_yO\alpha$.

A sintered magnet was produced as in the first specific example described above except that the formula $Ca_{1-x-x'}La_xSr_{x'}Fe_{2n-y}Co_yO\alpha$ would satisfy x=0.4, x'=0.4, y=0.3, and n=5.6 to 5.9. The remanences $B_r$ and coercivities $H_{cJ}$ of the resultant sintered magnets were measured. The results are shown in FIG. 6.

In Examples 4 and 5 and Comparative Example 6, x' (Sr) was varied. Specifically, x'=0.01 in Example 4, x'=0.2 in Example 5, and x'=0.4 in Comparative Example 1. It should be noted that x'=0.1 is associated with Example 1 (see FIG. 1) and x'=0.3 is associated with Example 2 (see FIG. 2). As can be seen easily from FIGS. 4 through 6 and FIGS. 1 and 2, although there were some differences according to the sintering temperature and the n value, good magnetic properties were achieved overall when x' was in the range of 0.01 to 0.3. When x'=0.4, which is outside of the preferred range of the present invention, $B_r$ decreased slightly. It can also be seen that as x' increases, the preferred n value tends to increase.

Example 6

A sintered magnet was produced as in the first specific example described above except that the formula $Ca_{1-x-x'}La_xSr_{x'}Fe_{2n-y}Co_yO\alpha$ would satisfy x=0.45, x'=0.1, y=0 to 0.6, and n=5.4 and that the sintering temperature was 1,190° C. The remanences $B_r$ and coercivities $H_{cJ}$ of the resultant sintered magnets were measured. The results are shown in FIG. 7.

Figure 7:
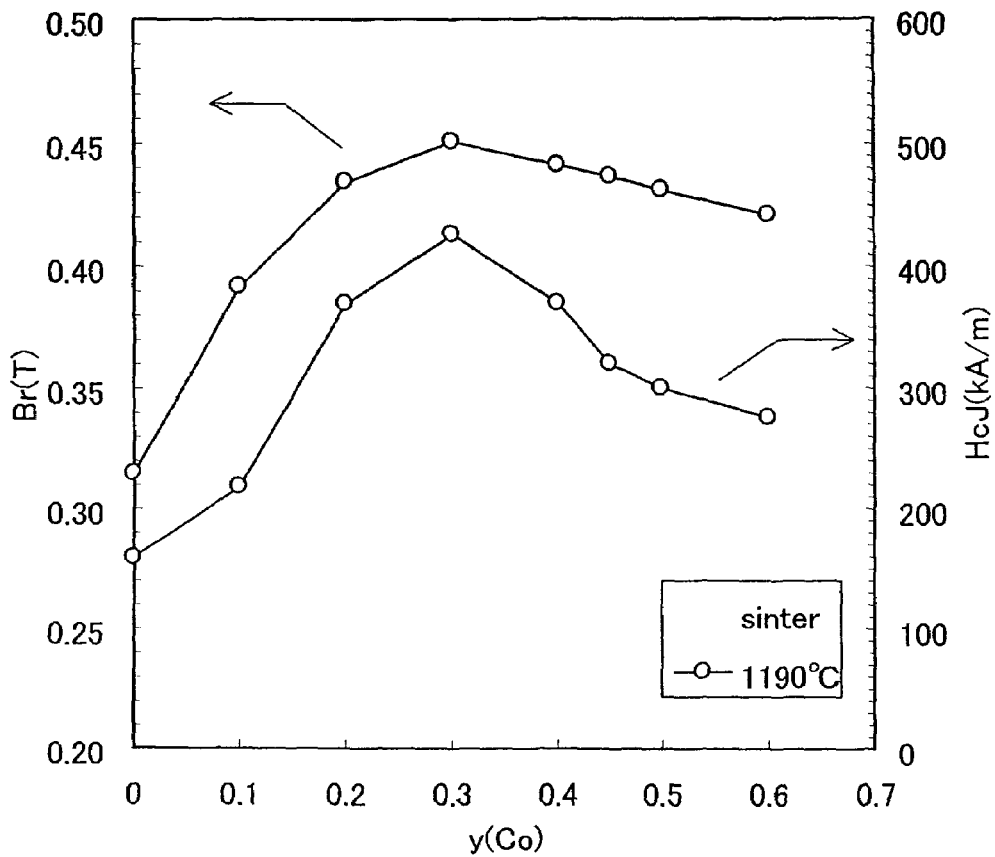
FIG. 7 is a graph showing relationships between the remanence $B_r$ and the coercivity $H_{cJ}$ of a sintered magnet according to a preferred embodiment of the present invention in a situation where x=0.45, x'=0.1, y=0 to 0.6, and n=5.4 in its compositional formula $Ca_{1-x-x'}La_xSr_{x'}Fe_{2n-y}Co_yO\alpha$ and where the sintering temperature is 1,190° C.

As can be seen easily from FIG. 7, good magnetic properties, including a $B_r$ of 0.43 T or more and an $H_{cJ}$ of 320 kA/m (=4 kOe) or more, were achieved when y (Co) was in the range of 0.2 to 0.45 and good magnetic properties, including a $B_r$ of 0.43 T or more and an $H_{cJ}$ of 360 kA/m (=4.5 kOe) or more, were achieved when y (Co) was in the range of 0.2 to 0.4. Particularly when y (Co) was in the range of 0.25 to 0.35, excellent magnetic properties, including a $B_r$ of 0.45 T or more and an $H_{cJ}$ of 360 kA/m (=4.5 kOe) or more, were achieved. That is why y was defined to fall within the range of 0.2 to 0.45.

Example 7

A sintered magnet was produced as in the first specific example described above except that the formula $Ca_{1-x-x'}La_xSr_{x'}Fe_{2n-y}Co_yO\alpha$ would satisfy x=0.495, x'=0.01, y=0.3, and n=5.4 and that the calcining temperature was in the range of 1,150° C. to 1,300° C. The remanences $B_r$ and coercivities $H_{cJ}$ of the resultant sintered magnets were measured. The results are shown in FIG. 8.

Example 8

A sintered magnet was produced as in the first specific example described above except that the formula $Ca_{1-x-x'}La_xSr_{x'}Fe_{2n-y}Co_yO\alpha$ would satisfy x=0.45, x'=0.1, y=0.3, and n=5.4 and that the calcining temperature was in the range of 1,150° C. to 1,250° C. The remanences $B_r$ and coercivities $H_{cJ}$ of the resultant sintered magnets were measured. The results are shown in FIG. 9.

Figure 8:
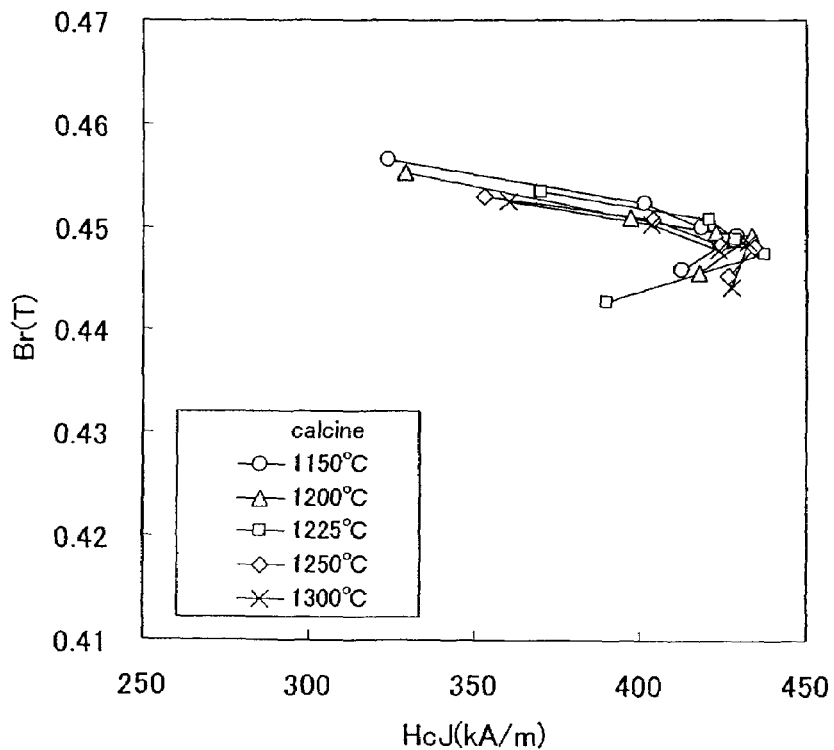
FIG. 8 is a graph showing relationships between the remanence $B_r$ and the coercivity $H_{cJ}$ of a sintered magnet according to a preferred embodiment of the present invention in a situation where x=0.495, x'=0.01, y=0.3, and n=5.4 in its compositional formula $Ca_{1-x-x'}La_xSr_{x'}Fe_{2n-y}Co_yO\alpha$ and where the calcining temperature is in the range of 1,150° C. to 1,300° C.
Figure 9:
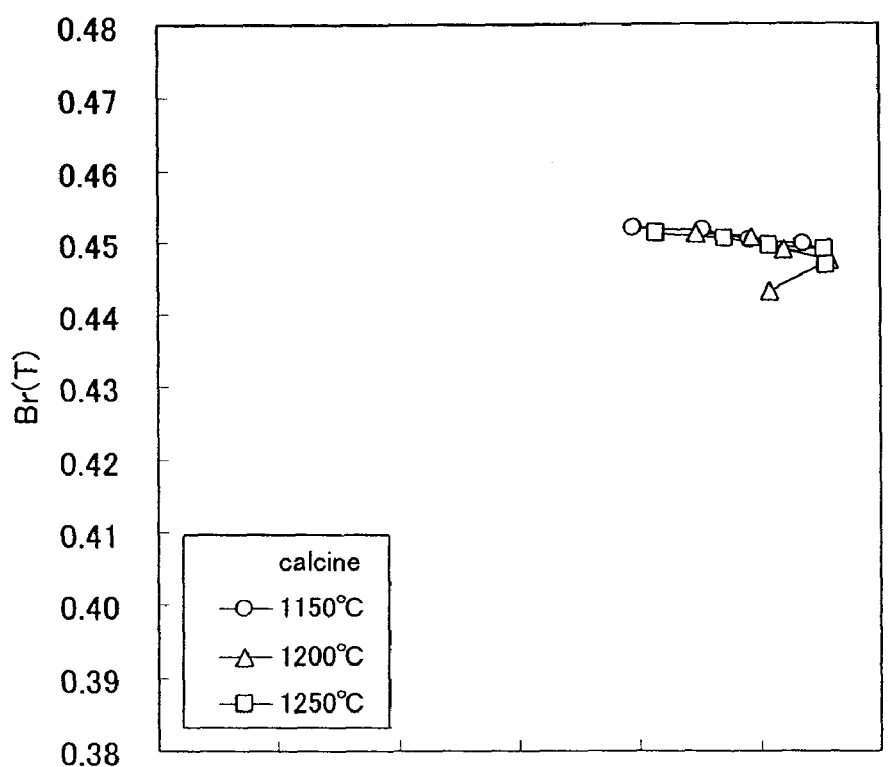
FIG. 9 is a graph showing relationships between the remanence $B_r$ and the coercivity $H_{cJ}$ of a sintered magnet according to a preferred embodiment of the present invention in a situation where x=0.45, x'=0.1, y=0.3, and n=5.4 in its compositional formula $Ca_{1-x-x'}La_xSr_{x'}Fe_{2n-y}Co_yO\alpha$ and where the calcining temperature is in the range of 1,150° C. to 1,250° C.

As can be seen easily from FIGS. 8 and 9, good magnetic properties were achieved at every calcining temperature although there were some variations according to the sintering temperature.

Example 9

The calcined body with n=5.4 obtained as the first specific example was observed with an SEM. The result is shown in FIG. 10.

Comparative Example 2

A calcined body was made as in the first specific example described above except that the formula $Ca_{1-x-x'}La_xSr_{x'}Fe_{2n-y}Co_yO\alpha$ would satisfy x=0.5, x'=0, y=0.3, and n=5.4 and was observed with an SEM. The result is shown in FIG. 11.

Figure 10:
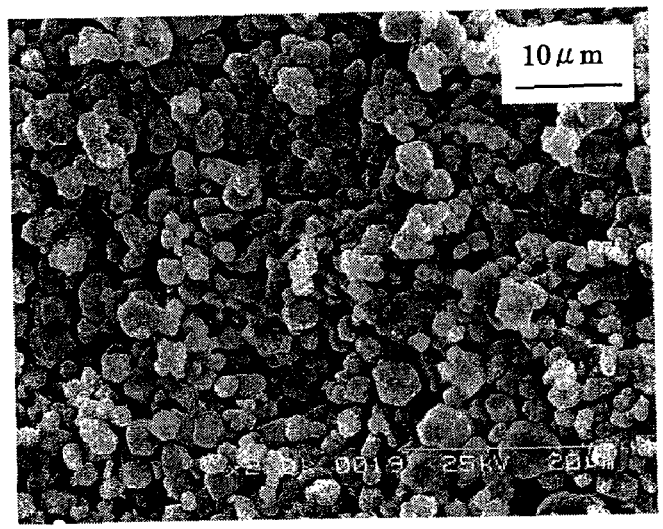
FIG. 10 is a SEM photograph substituting for a drawing to show a calcined body according to a preferred embodiment of the present invention in a situation where x=0.45, x'=0.1, y=0.3, and n=5.4 in its compositional formula $Ca_{1-x-x'}La_xSr_{x'}Fe_{2n-y}Co_yO\alpha$.
Figure 11:
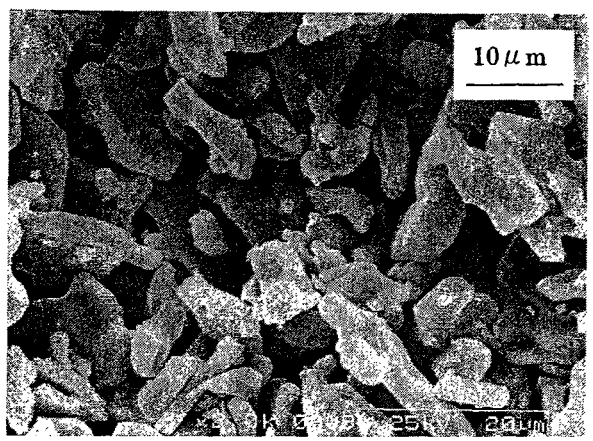
FIG. 11 is a SEM photograph substituting for a drawing to show a calcined body according to a comparative example in a situation where x=0.5, x'=0, y=0.3, and n=5.4 in its compositional formula $Ca_{1-x-x'}La_xSr_{x'}Fe_{2n-y}Co_yO\alpha$.

As is clear from FIGS. 10 and 11, the calcined body according to a preferred embodiment of the present invention consists mostly of almost spherical crystals with diameters of 1 µm to 8 µm and aspect ratios (i.e., the ratios of the length l to the thickness d) that are close to one. On the other hand, the calcined body of the comparative example, to which no Sr was added (i.e., x'=0), consists mostly of plate-like crystals with thicknesses of 2 µm to 5 µm, lengths of 10 µm to 20 µm and aspect ratio that are greater than three. The oxide magnetic material according to a preferred embodiment of the present invention would have achieved a high $B_r$ and a high $H_{cJ}$ because the crystals in the calcined body should have had its size and aspect ratio reduced by replacing a portion of Ca with Sr.

Example 10

The calcined body with n=5.4 that was obtained as the first specific example of the present invention was finely pulverized to a mean particle size of about 1.0 µm as measured by the air permeability method. Thereafter, the calcined body was dried, crushed and then thermally treated at 1,000° C., thereby making a ferrite magnet powder. The saturation magnetization (σs) and anisotropic magnetic field (HA) of the ferrite magnet powder thus obtained were measured. As a result, the saturation magnetization (σs) was 75.9 emu/g and anisotropic magnetic field (HA) was 2.18 MA/m (=27.4 kOe).

Bonded magnets shaped for motors were made of the ferrite magnet powder, put into a motor in place of conventional bonded magnets of an SrLaCo ferrite, and operated under rated conditions. As a result, good properties were achieved. Also, the torque of that motor was measured to be higher than a motor with conventional bonded magnets of an SrLaCo ferrite.

When the ferrite magnet powder was used in a magnetic recording medium, a high output and a high SNR were realized.

Example 11

First, a $CaCO_3$ powder, an $La_2O_3$ powder, an $SrCO_3$ powder, an $Fe_2O_3$ powder and a $Co_3O_4$ powder were provided and mixed together such that the formula $Ca_{1-x-x'}La_xSr_{x'}Fe_{2n-y}Co_yO\alpha$ would satisfy x=0.485, x'=0.05, y=0.35, x/y=1.38 and n=5.3. After 0.1 mass % of $H_3BO_3$ was further added thereto, the resultant material powders were mixed together in a wet ball mill for four hours, dried, and then sieved. Thereafter, the powder was calcined in the air at 1,200° C., 1,250° C. for three hours, thereby obtaining a calcined body in the form of powder.

Next, 0.3 mass % of $CaCO_3$ powder (when converted into CaO) and 0.352 mass % of $SiO_2$ powder were further added to the calcined body. Then, using water as a solvent, the mixture was finely pulverized in a wet ball mill to a mean particle size of 0.55 µm as measured by the air permeability method. Thereafter, while the solvent was removed from the resultant finely pulverized slurry, the slurry was pressed and compacted under a magnetic field with a strength of 0.8 T. Next, the resultant compact was sintered in the air at 1,190° C. to 1,200° C. for one hour to make a sintered magnet. The remanences $B_r$ and coercivities $H_{cJ}$ of the resultant sintered magnets were measured. The results are shown in FIG. 12.

Example 12

A sintered magnet was produced as in the eleventh specific example described above except that the formula $Ca_{1-x-x'}La_xSr_{x'}Fe_{2n-y}Co_yO\alpha$ would satisfy x=0.575, y=0.4 and x/y=1.43 and that 0.2 mass % of $H_3BO_3$ was added to the material powder yet to be pulverized with a wet ball mill. The remanences $B_r$ and coercivities $H_{cJ}$ of the resultant sintered magnets were measured. The results are shown in FIG. 13.

Figure 12:
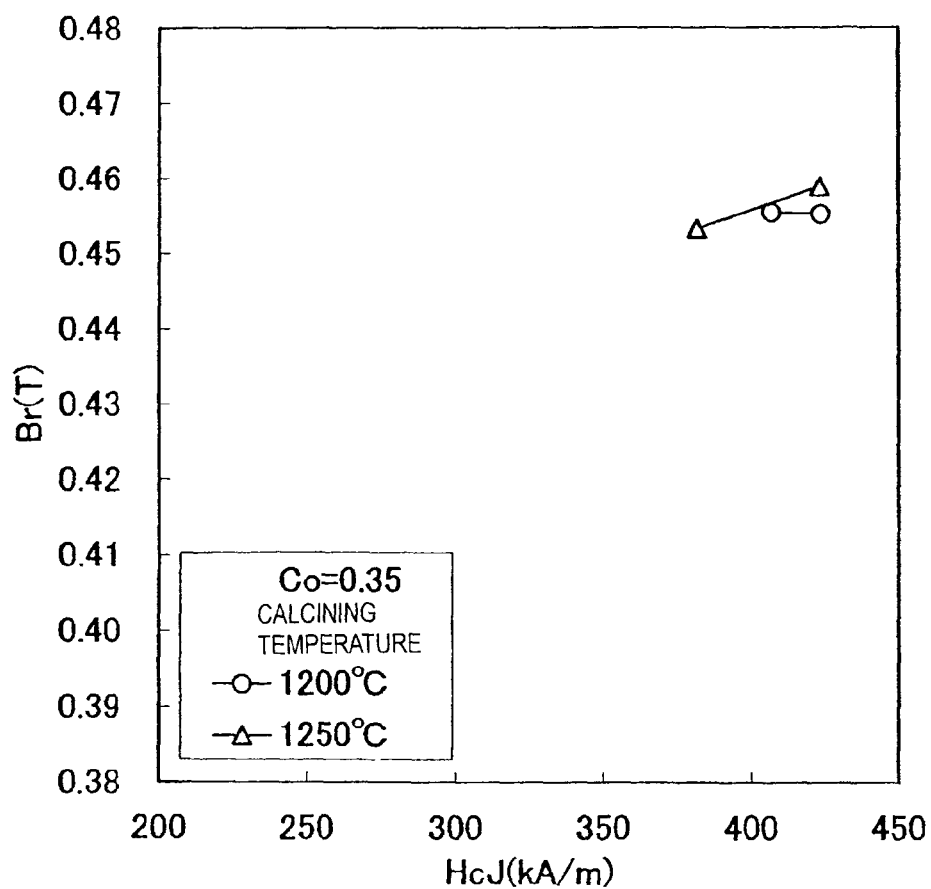
FIG. 12 is a graph showing relationships between the remanence $B_r$ and the coercivity $H_{cJ}$ of a sintered magnet according to a preferred embodiment of the present invention in a situation where x=0.485, x'=0.05, y=0.35, and n=5.3 in its compositional formula $Ca_{1-x-x'}La_xSr_{x'}Fe_{2n-y}Co_yO\alpha$.
Figure 13:
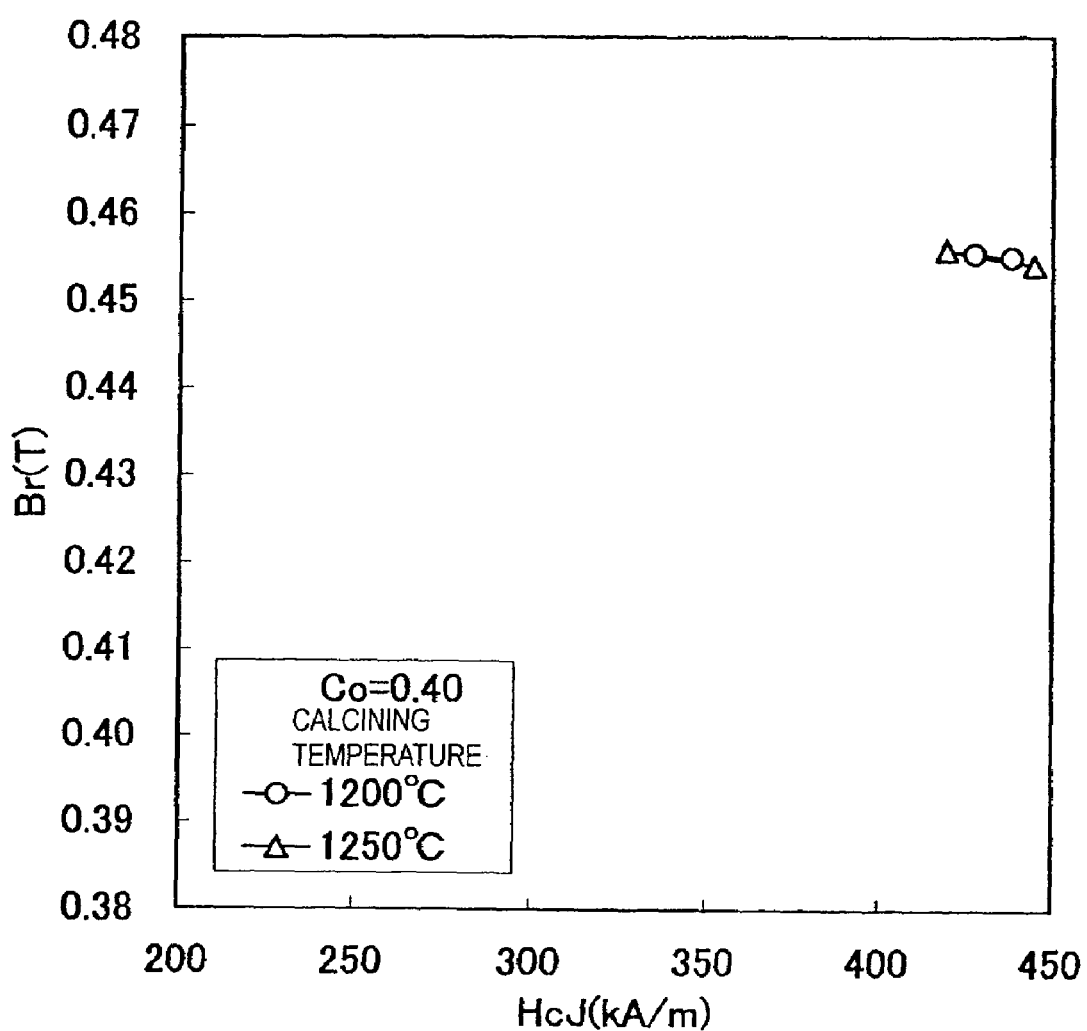
FIG. 13 is a graph showing relationships between the remanence $B_r$ and the coercivity $H_{cJ}$ of a sintered magnet according to a preferred embodiment of the present invention in a situation where x=0.575, x'=0.05, y=0.4, and n=5.3 in its compositional formula $Ca_{1-x-x'}La_xSr_{x'}Fe_{2n-y}Co_yO\alpha$.

As can be seen easily from FIGS. 12 and 13, in ranges with high x and y mole fractions (e.g., a range in which (La)=0.485, y (Co)=0.35 and x/y=1.38 and a range in which x (La)=0.575, y (Co)=0.4 and x/y=1.43), outstanding magnetic properties, including a $B_r$ of 0.45 T or more and an $H_{cJ}$ of 400 kA/m (=5 kOe) or more, were realized.

An oxide magnetic material according to a preferred embodiment of the present invention has a remanence $B_r$ and a coercivity $H_{cJ}$ that are both superior to those of conventional SrLaCo and CaLaCo ferrites, and can be used effectively in high-performance motors.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An oxide magnetic material comprising a ferrite with a hexagonal structure as its main phase, wherein metallic elements included in the oxide magnetic material are represented by the formula:

$$Ca_{1-x-x'}La_xSr_{x'}Fe_{2n-y}Co_y,$$

where atomic ratios x, x' and y and a molar ratio n satisfy:
$0.4 \leq x \leq 0.55$;
$0.01 \leq x' \leq 0.2$;
$0.2 \leq y \leq 0.4$;
$x/y \geq 1.3$;
$1-x-x' \geq x'$; and
$5.2 \leq n \leq 5.8$; respectively.

2. The oxide magnetic material of claim 1, wherein the molar ratio n satisfies $5.3 \leq n \leq 5.5$.

3. The oxide magnetic material of claim 1, wherein the material is a calcined body.

4. The oxide magnetic material of claim 3, wherein the material includes at least 50% of crystals with an aspect ratio of three or less, the aspect ratio being the ratio of the length l to the thickness d of the crystals.

5. The oxide magnetic material of claim 1, wherein the material is a sintered magnet.

6. The oxide magnetic material of claim 5, wherein the material has a coercivity $H_{cJ}$ of 360 kA/m or more.

7. The oxide magnetic material of claim 5, wherein the material has a remanence $B_r$ of 0.45 T or more.

8. A magnetic recording medium comprising the oxide magnetic material of claim 3.

9. A bonded magnet comprising the oxide magnetic material of claim 3.

10. A rotating machine comprising the oxide magnetic material according to claim 5.

11. An sintered magnet comprising a ferrite with a hexagonal structure as its main phase, wherein metallic elements included in the sintered magnet are represented by the formula:

$$Ca_{1-x-x'}La_xSr_{x'}Fe_{2n-y}Co_y,$$

where atomic ratios x, x' and y and a molar ratio n satisfy:
$0.4 \leq x \leq 0.55$;
$0.01 \leq x' \leq 0.2$;
$0.2 \leq y \leq 0.4$;
$x/y \geq 1.3$;
$1-x-x' \geq x'$; and
$4.3 \leq n \leq 5.8$; respectively; and
the sintered magnet is made by adding at least one of 1.8 mass % of less of $CaCO_3$, 0.5 mass % or less of $SrCO_3$, and 1.0 mass % of less of $SiO_2$ to a calcined body of an oxide magnetic material and then sintering the mixture.

* * * * *